(12) United States Patent
Fujimori (10) Patent No.: US 8,149,244 B2
(45) Date of Patent: Apr. 3, 2012

(54) PROJECTION SYSTEM, INFORMATION PROCESSING APPARATUS AND PROJECTOR

(75) Inventor: Toshiki Fujimori, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 726 days.

(21) Appl. No.: 12/260,292

(22) Filed: Oct. 29, 2008

(65) Prior Publication Data
US 2009/0268103 A1 Oct. 29, 2009

(30) Foreign Application Priority Data
Oct. 30, 2007 (JP) ................................. 2007-281395

(51) Int. Cl.
| | |
|---|---|
| G09G 5/02 | (2006.01) |
| G09G 3/36 | (2006.01) |
| G09G 5/10 | (2006.01) |
| H04N 7/00 | (2006.01) |
| H04N 5/202 | (2006.01) |
| H03M 7/16 | (2006.01) |
| G06K 9/40 | (2006.01) |
| H04N 5/46 | (2006.01) |
| H04N 11/00 | (2006.01) |
| H03M 7/40 | (2006.01) |
| G03B 21/56 | (2006.01) |

(52) U.S. Cl. ........ 345/600; 345/605; 345/690; 345/596; 345/89; 348/441; 348/552; 348/671; 348/744; 341/61; 341/97; 359/443; 382/254; 382/274

(58) Field of Classification Search .................. 345/581, 345/589, 600–605, 606, 690, 596, 204, 63, 345/89; 348/441, 552, 671, 744; 349/5, 349/173; 341/61, 97, 98–99; 359/443, 649; 353/28–30; 382/254, 237, 274, 276
See application file for complete search history.

(56) References Cited

U.S. PATENT DOCUMENTS

| | | | | |
|---|---|---|---|---|
| 5,267,333 A | * | 11/1993 | Aono et al. | .................. 382/166 |
| 5,722,420 A | | 3/1998 | Lee | |
| 2002/0005854 A1 | * | 1/2002 | Deering et al. | ............... 345/596 |
| 2003/0096331 A1 | * | 5/2003 | Dambinova | ................. 435/7.92 |
| 2009/0103053 A1 | * | 4/2009 | Ichikawa et al. | ................ 353/33 |

FOREIGN PATENT DOCUMENTS

| | | |
|---|---|---|
| JP | 2007-163725 | 6/2007 |
| WO | 2004/050172 A1 | 6/2004 |
| WO | 2006/021952 2 | 3/2006 |
| WO | 2006/039403 A1 | 4/2006 |

* cited by examiner

*Primary Examiner* — Wesner Sajous
(74) *Attorney, Agent, or Firm* — Maschoff Gilmore & Israelsen (57) ABSTRACT

A projection system comprising an information processing apparatus capable of processing image data and a projector capable of performing a display process on the image data processed by the information processing apparatus, when the bit number representing the number of gradations of pixel data transmitted from the information processing apparatus to the projector is n-bit and the bit number representing the number of gradations which can be expressed by the projector is m-bit (m>n). The image processing apparatus outputs image data where m-bit pixel data is divided into k-pieces of pixel data of at most n-bits, and the projector synthesizes the k-pieces of pixel data based on a set synthesis rule to generate the m-bit pixel data in the pixel.

9 Claims, 6 Drawing Sheets

FIG. 2

*200* PROJECTOR
[BIT PRECISION: m-BIT]
(m>n)

FIRST PIXEL DATA

FIG. 3D

SECOND PIXEL DATA

FIG. 3E

SYNTHESIZED m-BIT PIXEL DATA

FIG. 3F

DATA TRANSMISSION

*100* INFORMATION PROCESSING APPARATUS
[BIT PRECISION: n-BIT]

PIXEL DATA OF CERTAIN PIXEL (m-BIT)

FIG. 3A

FIRST PIXEL DATA

FIG. 3B

SECOND PIXEL DATA

FIG. 3C

*100* INFORMATION PROCESSING APPARATUS [BIT PRECISION: 8-BIT]

*200* PROJECTOR [BIT PRECISION: 12-BIT]

FIG. 6A ORIGINAL IMAGE (12-BIT PRECISION)

FIG. 6B EVEN PIXEL: HIGH-ORDER 8-BIT FIRST PIXEL DATA

FIG. 6C ODD PIXEL: LOW-ORDER 4-BIT SECOND PIXEL DATA

FIG. 6D TRANSVERSE DIRECTION OF ORIGINAL IMAGE IS DOUBLED BECAUSE OF 12-BIT DISPLAY

FIG. 6E FIRST PIXEL DATA IN EVEN PIXEL IS FOR HIGH-ORDER 8-BIT / SECOND PIXEL DATA IN ODD PIXEL IS FOR LOW-ORDER 4-BIT

FIG. 6F RECOVERED IMAGE (12-BIT PRECISION)

DATA TRANSMISSION

PROJECTION SYSTEM, INFORMATION PROCESSING APPARATUS AND PROJECTOR

CROSS REFERENCES TO RELATED APPLICATIONS

The entire disclosure of Japanese Patent Application No. 2007-281395, filed Oct. 30, 2007 is expressly incorporated herein by reference.

BACKGROUND

1. Technical Field

The present invention relates to a projection system. More specifically, the present invention relates to an information processing apparatus and projector for a projector system.

2. Related Art

One type of projection system currently known in the art is a so-called host-based type projection system, in which most of the image processing performed in a projector is executed by an information processing apparatus such as a personal computer, which is then sent to the projector to project the data.

In such host-based type projection systems, the image processing ability of the information processing apparatus must be high enough to enable high-quality image projection. Various technologies have been proposed in the past which enable high-quality image projection, including the system described in Japanese Patent Application No. JP-A-2004-69996.

In the system described in JP-A-2004-69996, image data is generated by an information processing apparatus which corresponds to the specification of the display device of the projector This process includes converting the image data to the correct resolution, performing gamma correction or color shading correction and the like. Following this process, the image data is transmitted to the projector.

In the video equipment currently known in the art, particularly in projectors, it is preferable to have a high-gradation video display which uses bit precision of more than 10-bit according to color information such as RGB.

One problem with many systems, however, is that the information processing apparatus generally outputs color information in 8-bit, and even when the projector which can display high-gradation data, meaning that the output of the color information to the projector is actually limited to bit precision of 8-bit.

The same problems apply to the above related art. More specifically, it is necessary to perform image processing when an image signal cable is used as a transmission line to a display or screen, which creates limitations in the bit precision of the display. For example, when a GPU (Graphic Processing Unit) is used to execute image processing at high speeds, internal calculations can be executed to generate color information with bit precision more than 8-bit. Unfortunately, however, it is necessary that the improved bit precision is limited to the display ability (8-bit) of the screen. Therefore, it is difficult to transmit the result of image processing to the projector as image data as high-precision data with more than 8-bit color information.

BRIEF SUMMARY OF THE INVENTION

An advantage of some aspects of the invention is to provide a projection system capable of outputting image data to a projector, which has gradation number larger than gradation number which can be outputted by the information processing apparatus as a component of the projection system, an information processing apparatus used for the projection system and a projector used for the projection system.

According to a first aspect of the invention, there is provided a projection system comprising an information processing apparatus capable of processing image data corresponding to an image to be displayed comprised of m-bit pixel data and outputting k-pieces of pixel data of at most n-bits, and a projector capable of receiving the k-pieces of pixel data from the information processing apparatus, performing a synthesis process of the k-pieces of pixel data of the image data processed by the information processing apparatus based on a predetermined synthesis rule in order to generate a synthesized image comprised of m-bit pixel data, and displaying the synthesized image, wherein k is an integer of 2 or more.

A second aspect of the system comprises an information processing apparatus for a projection system including a projector. The information processing apparatus comprises an image data dividing unit capable of processing image data corresponding to an image comprised of m-bit pixel data into k-pieces of pixel data of at most n-bits, and a image data transmission unit capable of transmitting the k-pieces of pixel data of at most n-bits to a projector, wherein k is an integer of 2 or more and the projector is capable of receiving the k-pieces of pixel data, performing a synthesis process of the k-pieces of pixel data based on a predetermined synthesis rule in order to generate a synthesized image comprised of m-bit pixel data, and displaying the synthesized image.

A third aspect of the invention is a projector which is used for a projection system comprising an information processing apparatus capable of processing image data corresponding to an image to be displayed. The projector comprises an image data receiving unit capable of receiving image data from the information processing apparatus, the image data comprising k-pieces of pixel data corresponding to an image comprised of m-bit pixel data which has been divided into k-pieces by the information processing apparatus, an image decoding unit capable of performing a synthesis process of the k-pieces of pixel data based on a predetermined synthesis rule in order to generate a synthesized image comprised of m-bit pixel data, and a image display unit capable of displaying the synthesized image, wherein k is an integer of 2 or more.

Using the systems and methods described more fully below, it is possible to synthesize image data generated in the information processing apparatus, that is, image data divided into k-pieces of pixel data of at most n-bits Thus, it is possible to maintain a higher resolution display, despite the limitations of the components of the system.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
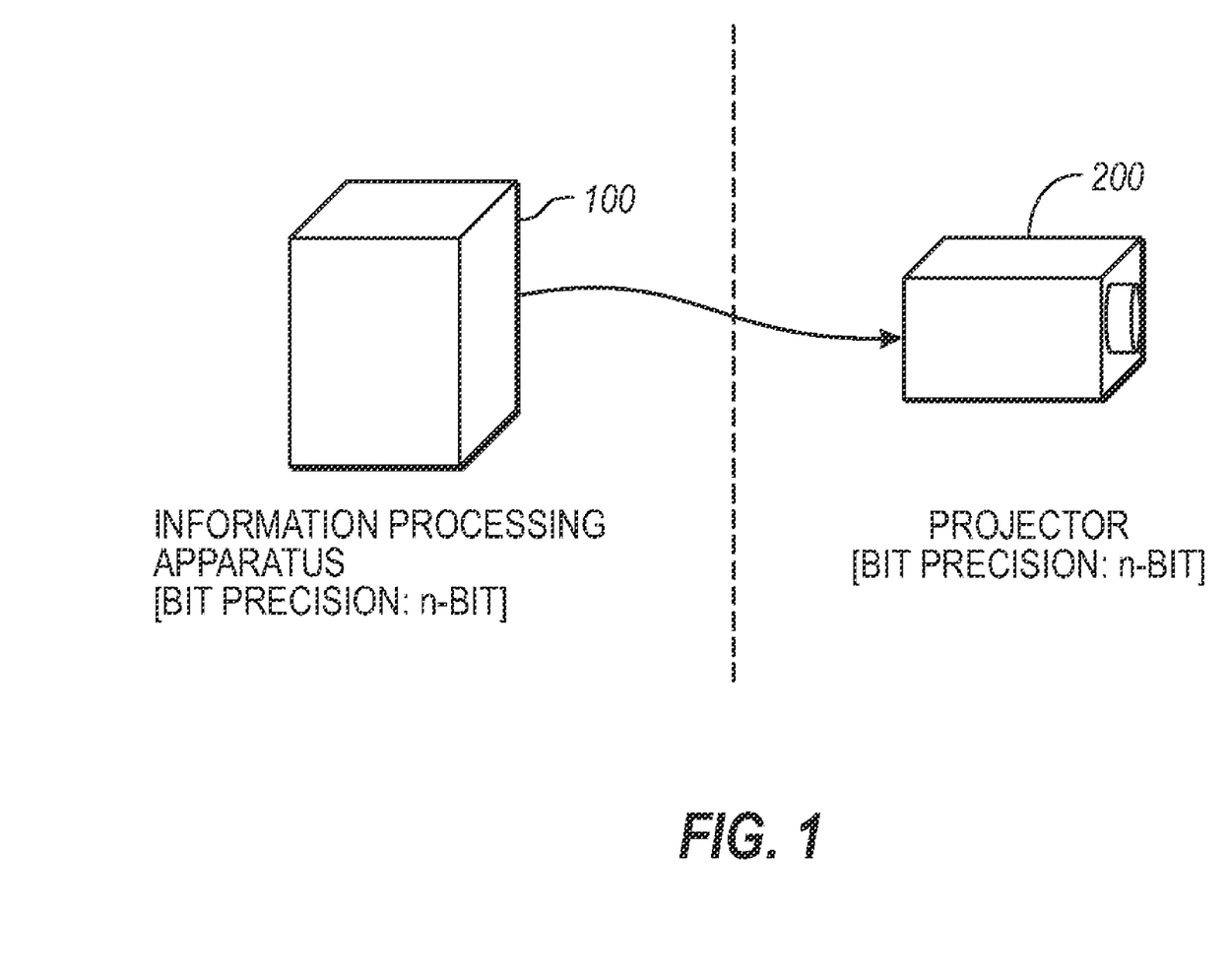
FIG. 1 is a view showing a configuration of a projection system according to respective embodiments of the invention.

FIG. 1 is a view showing a configuration of a projection system according to respective embodiments of the invention. As shown in FIG. 1, the projection system according to one embodiment of the invention includes an information processing apparatus 100 such as a personal computer and a projector 200. Most of the image data processing of an image (referred to as an original image) to be displayed by the projector 200 is performed on the information processing apparatus 100. The processed image data is then transmitted to the projector 200 in order to perform projection on a projection surface (not shown) by performing necessary minimum image processing in the projector 200.

The number of gradations which can be outputted by the information processing apparatus 100 is assumed to be smaller than the number of gradations which can be expressed by the projector. Assume that the bit number (referred to as bit precision) which correspond the number of gradations which can be outputted by the information processing apparatus 100 is n-bit, while the bit precision indicating the number of gradations which can be expressed by the projector 200 is m-bit, where m>n.

Figure 2:
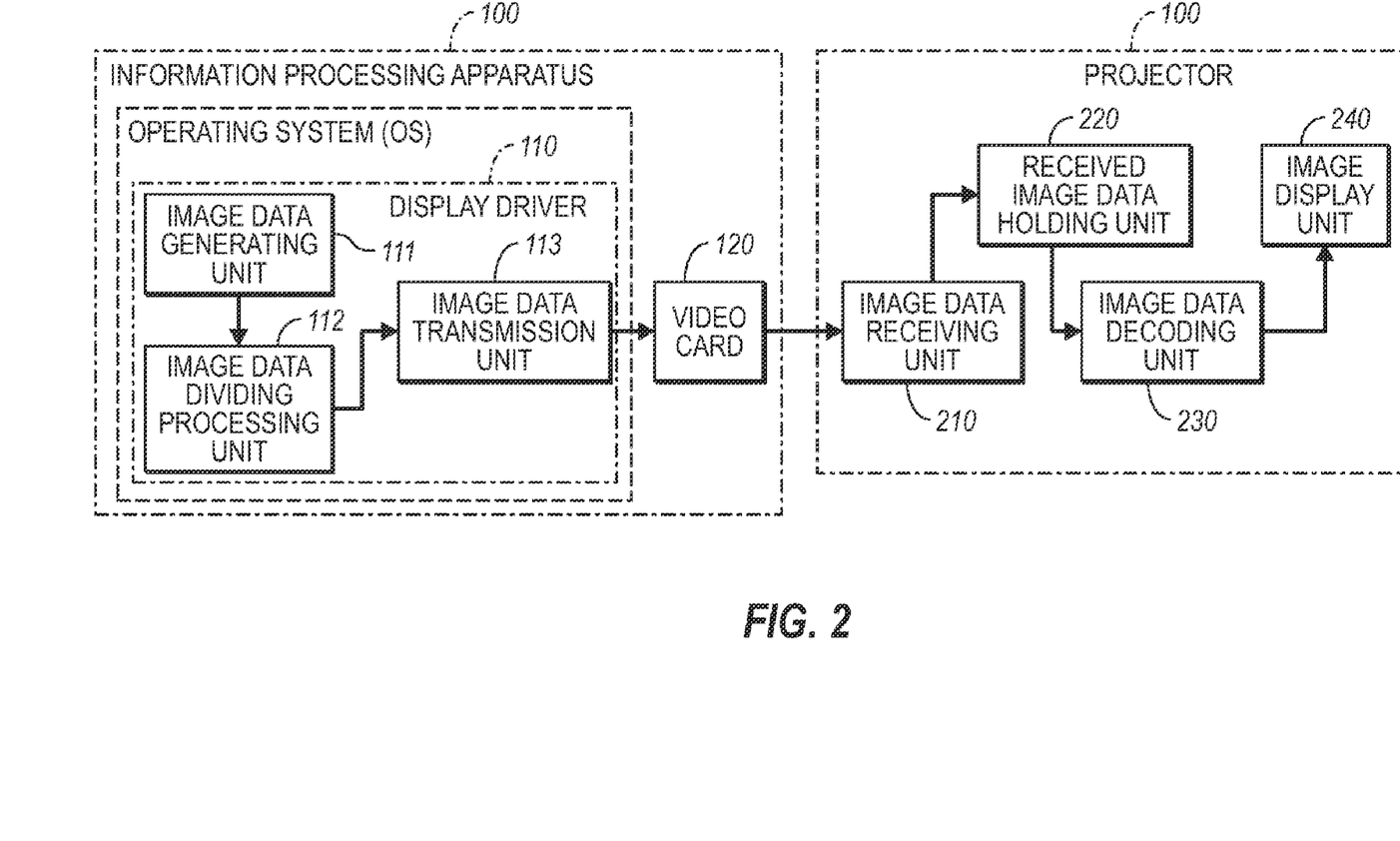
FIG. 2 is a view showing respective configurations of an information processing apparatus and a projector.

FIG. 2 is a view showing respective configurations of the information processing apparatus 100 and the projector 200. The information processing apparatus 100 includes an operating system (OS) which includes a display driver 110. The information processing apparatus 100 also includes a video card 120 which is capable of performing image display control with respect to a display. The display driver 110 includes an image data generating unit 111 for generating image data corresponding to the original image, an image data dividing processing unit 112 and an image data transmission unit 113.

The image data generating unit 111 is capable of generating image data having bit precision (m-bit) equivalent to the projector 200. The image data dividing processing unit 112 performs a processing operating on the image data generated by the image data generating unit 111 by dividing the m-bit precision data (referred to as pixel data) into k-pieces (k is an integer of 2 or more) of pixel data having at most n-bit precision The image data divided in the image data dividing processing unit 112 is then transferred to the projector 200 by the image data transmission unit 113 through the video card 120.

The projector 200 includes an image data receiving unit 210, a received image data holding unit 220 for storing image data received in the image data receiving unit 210, an image data decoding unit 230 for performing a decoding process, which will be described more fully below, on the image data held in the received image data holding unit 220 based on a predetermined synthesis rule, and an image display unit 240 for performing image display processing based on the image data decoded by the image data decoding unit 230. The image display unit 240 includes components which are necessary for displaying images by the projector such as a light source, a light modulation element, or a projection system, which are not shown in FIG. 2.

In the configuration as shown in FIG. 2, when power of the projector 200 as a display is turned on, a display name, resolution, the number of colors, the number of gradations and the like of itself are transmitted from the projector 200 to the information processing apparatus 100. Then the display driver 110 stored in the information processing apparatus 100, the display driver 110 which corresponds to the display name, resolution, number of colors, number of gradations and the like of projector 200 is activated.

FIG. 3 is a view explaining the basic image data process executed in a projection system according to an embodiment of the invention. Schematically, the image processing apparatus 100 divides pixel data of the original image generated in the image data generating unit having m-bit precision, shown in FIG. 3A, into k-pieces of pixel data, where k is an integer of 2 or more, in order to create image data with a maximum of n-bit precision Then, the k-pieces of pixel data obtained by dividing data, shown in FIGS. 3B and 3C are sent to the projector 200.

Here, the k-pieces of pixel data includes at least one set of pixel data formed with high-order n-bits and at least one pixel data formed with (m-n) bits. In this example, assume that m≦2n for simplifying explanation. Therefore, the number of sets of pixel data "k" generated by dividing data is k=2. Explanation will be made using the assumption that the first set of pixel data formed has n-bits and is also referred to as the high-order bit, and the second set of pixel data is formed with (m-n) bits. The (m-n) bit is also referred to as the low-order (m-n) bit.

Figure 3A:
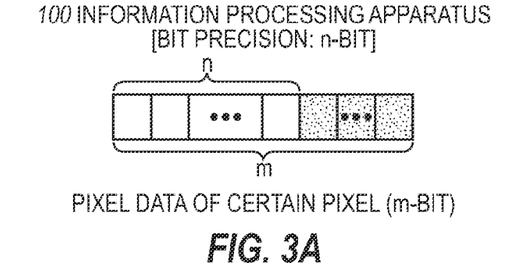
FIGS. 3A-3F illustrate basic image data processing which may be executed in a projection system according to an embodiment of the invention.
Figure 3B:
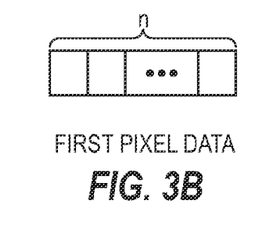
Figure 3C:
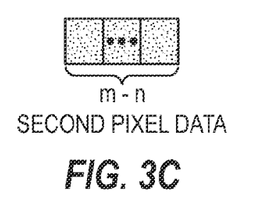

More specifically, when the number of gradations of respective colors (R, G and B) in image data generated in the image data generating unit 111 is expressed in m-bits, the image data dividing processing unit 112 creates a set of pixel data with high-order n-bits from the m-bit pixel data and designates the high-order n-bit data as the first pixel data, as shown in FIG. 3B. The image data dividing processing unit 112 also creates a set of pixel data of a lower-order, with (m-n) bits from the remaining m-bit pixel data and designates the data as the second pixel data, which is shown in FIG. 3C.

Figure 3D:
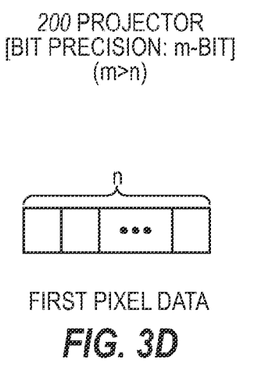
Figure 3E:
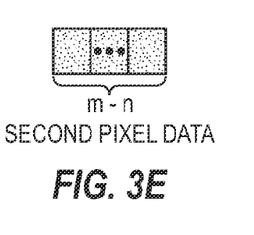
Figure 3F:
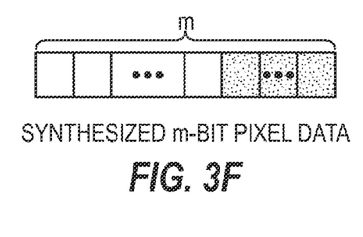

Upon receiving the k pieces of pixel data, the projector 200 synthesizes k-pieces of pixel data transmitted from the information processing apparatus 100 (in this case, the first and second sets of pixel data) on a frame buffer based on the predetermined synthesis rule and generates pixel data having m-bit precision, as shown in FIGS. 3D-3F.

As described above, in the case that the bit precision (m-bit) of image data generated in the image data generating unit 111 is higher than the bit precision (n-bit) which can be expressed in the image processing apparatus 100, the image processing apparatus 100 divides m-bit pixel data into a number of pixel sets with the highest bit-precision (n-bit) which can be outputted to the projector. This allows the information processing apparatus to output only image data of n-bit precision, which includes all the information with in the image data of m-bit precision.

In return, the projector 200 synthesizes the first and second set of pixel data, shown in FIG. 3D and FIG. 3E, respectively, that are transmitted from the information processing apparatus 100 by the image data decoding unit 230 based on the predetermined synthesis rule on the frame buffer, as shown in FIG. 3F The synthesis rule in this case is a synthesis rule in which the first pixel data is designated as high-order bit and is placed first and the second pixel data is designated as low-order bit and is placed second to the higher-ordered bits, wherein the synthesis is performed based on such synthesis rule.

According to the above, m-bit pixel data can be generated from the first and second sets of pixel data Then, the m-bit pixel data is inputted to the image display unit 240 of the projector 200, which then displays the image including m-bit precision in the projector 200.

Thus, in the information processing apparatus 100 and the projector 200, it is possible to output image data having bit precision (m-bit) even when bit precision of image data outputted from the information processing apparatus 100 is limited to n-bits by performing the process shown in FIGS. 3A-3F. Specific embodiments of the invention will be explained hereinafter.

Embodiment 1

FIGS. 4A-4F illustrate image data processes that may be executed in the projection system according to first embodiment. In the projection system according to the first embodiment, the information processing apparatus 100 writes high-order n-bit pixel data first and low-order (m-n)-bit pixel data second by separating data according to the writing positions of the data in the m-bit pixel data. Also in the first, it is assumed that $m \leqq 2n$, meaning that the number of pixel data sets "k" generated by dividing data is k=2.

Figure 4A:
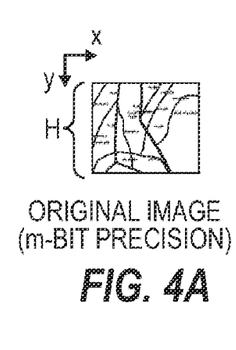
FIGS. 4A-4F illustrate image data processing executed in a projection system according to a first embodiment.
Figure 4B:
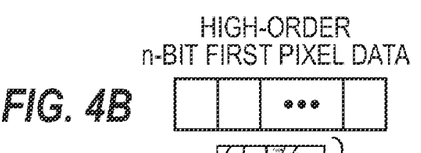
Figure 4C:
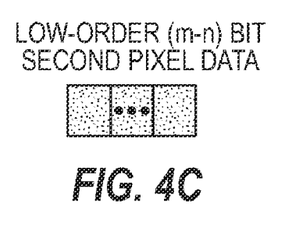

Specifically, assuming that there is an original image having m-bit precision at each pixel, as shown in FIG. 4A, the original image having m-bit precision is divided into a first set of high-order n-bit pixel data, shown in FIG. 4B, and a second set of low-order (m-n)-bit pixel data, shown in FIG. 4C. Then, the first set of high-order n-bit pixel data in each pixel and the low-order (m-n)-bit second pixel data of the pixel are written at positions divided in the space, respectively.

In this case, the projector 200 gives virtual resolution information to the information processing apparatus 100 indicating that the display may be performed at a resolution k-times as high as the original resolution (double-resolution in this case because k=2. Using this information, the information processing apparatus 100 sets an image data writing area corresponding to double resolution, and writes the first and second sets of pixel data at positions corresponding to the pixel separately by each pixel of the original image.

Figure 4D:
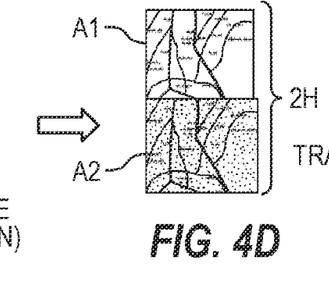

Specifically, when the length of the original image, such as the image shown in FIG. 4A, is "H" in the y-axis direction on (x, y) coordinates, an image data writing area is set with the length of "2H" in the y-axis direction, as shown in FIG. 4D. In the upper half A1 of the image data writing area of the display size of "2H", the first set of high-order n-bit pixel data is written, and in the image data writing area A2 of the lower half, the second set of low-order (m-n)-bit pixel data in each pixel of the original image is written.

The correspondence between positions of the respective pixels in the image data writing area A1 of upper half and in the image data writing area A2 of the lower half are as follows: When the length of the original image in the y-axis is "H", a pixel at a position of (x, y) coordinates in the image data writing area A1 of upper half corresponds to a pixel at a position of (x, y+H) coordinates in the image data writing area A2 of the lower half. For example, a pixel at a position of (0, 0) in the image data writing area A1 of upper half corresponds to a pixel at a position of (0, 0+H) in the image data writing area A2 of the lower half.

Accordingly, in the information processing apparatus 100, high-order n-bit first pixel data and low-order (m-n)-bit second pixel data are created from each pixel of the original image, and are written at corresponding positions in the space, thereby generating image data having double resolution in the y-axis direction.

In order to realize the above processing in the information processing apparatus 100, virtual resolution information is given to the information processing apparatus 100 as if the projector 200 is a display having resolution twice as high as the original image in the y-axis direction. The information processing apparatus 100 is capable of performing processing as shown in FIGS. 4A-4D based on the virtual resolution information from the projector 200. The processing shown in FIGS. 4A to 4D are performed by the image data dividing processing unit 112.

Figures 4E, 4F:
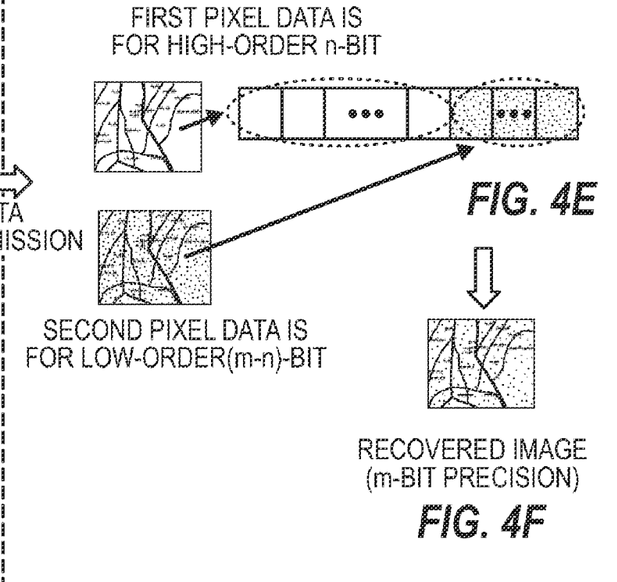

On the other hand, in the projector 200, image data transmitted from the information processing apparatus 100 is stored in the received image data holding unit 220, then, the image data decoding unit 230 synthesizes high-order n-bit first pixel data and low-order (m-n)-bit second pixel data on the frame buffer in accordance with the predetermined synthesis rule, shown in FIG. 4E. The synthesis rule in this case is a rule in wherein the first pixel data is designated as high-order bit and the second pixel data is designated as low-order bit in each pixel. The first pixel data and the second pixel data are synthesized in the pixel based on such synthesis rule. Thus, it is possible to recover the image as the original image having m-bit precision in each pixel by performing process shown in FIGS. 4A-4F for each pixel in the original image.

Embodiment 2

FIGS. 5A-5E illustrate an image data process executed in the projection system according to a second embodiment. In the projection system according to the second embodiment, the information processing apparatus 100 transmits the high-order n-bit first pixel data and low-order (m-n)-bit second pixel data generated by the image data dividing processing unit 112 to the projector 200 by allocating the data to continuous frames in the time-axis direction. Also in second embodiment, it is assumed that $m \leqq 2n$ and the number of pixel data "k" generated by dividing data is assumed to be k=2.

When the number of pixel data generated by the image data dividing processing unit 112 is assumed to be "k", the resolution becomes k-times higher in the projection system according to the first embodiment, however, in the projection system in the second, the frame rate is doubled.

In the projection system according to the second embodiment, the projector 200 gives virtual frame rate information to the information processing apparatus 100 indicating that a process is being performed at a frame rate twice as high as the original frame rate. Then, the information processing apparatus 100 sets an image data writing area corresponding twice the original frame rate based on the virtual frame rate information given by the projector 200. Then, the first pixel data and the second pixel data in each pixel are written separately at corresponding positions of the image data writing area in two consecutive frames in the time axis, respectively.

Figures 5A, 5B, 5C:
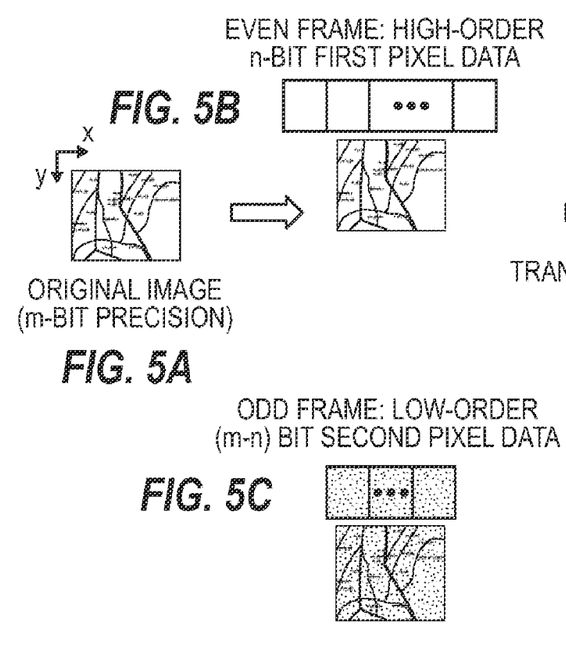
FIGS. 5A-5E illustrate image data processing executed in a projection system according to a second embodiment.

Specifically, when the frame numbers of having the frame rate twice as high as the original are represented by, for example, "0, 1, 2, 3, . . . " and frames "0, 2, 4, . . . " are designated as even frames, frames "1, 3, 5, . . . " are designated as odd frames. The high-order n-bit first pixel data, shown in FIG. 5B for the first pixel of an original image, shown in FIG. 5A, is written in the image data writing area corresponding to each pixel at 0th even frame. Then, the even frame is transmitted to the projector 200.

At the first odd frame, the low-order (m-n)-bit second pixel data, shown in FIG. 5C of the first pixel of the original image is written in the image data writing area corresponding to each pixel. Then, the odd frame is transmitted to the projector 200. The process shown in FIGS. 5A-5C is performed by the image data dividing processing unit 112.

Figures 5D, 5E:
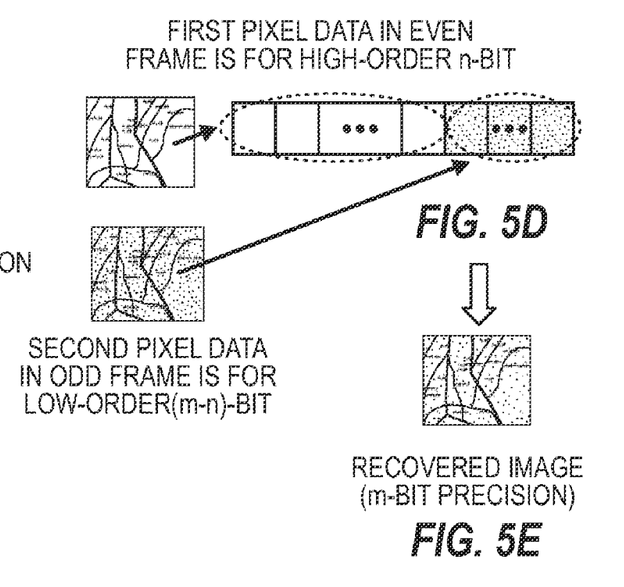

The projector 200 stores the first pixel data written in the even frame transmitted from the information processing apparatus 100 in the received image data holding unit 220. When the odd frame is transmitted, the image data decoding unit 230 synthesizes the first pixel data written in the even frame and the second pixel data written in the odd frame based on the predetermined synthesis rule on the frame buffer, as shown in FIG. 5D The synthesis rule in this case is a synthesis rule wherein the first pixel data written in the even frame is designated as high-order bit in the pixel and the second pixel data written in the odd frame is designated as low-order bit. Synthesis is performed on the frame buffer based on this synthesis rule. Using this system it is possible to recover the original image having m-bit precision, as shown in FIG. 5E.

Embodiment 3

A projection system according to a third embodiment is a case wherein, for example, Dual link DVI (DVI: digital Visual Interface) is used as an image data transmission unit between the image processing apparatus 100 and the projector 200. Dual link DVI performs a function in which two systems of DVI cables exist in one transmission cable. Therefore, the image data receiving unit 210 in the side of the projector 200 is required to have a function equivalent to two-systems of Single link DVI receiver. Note that Dual link DVI has a process wherein two bits of information forming a pair are allocated to first and second transmission systems, and can be transmitted at the same time.

In the projection system in which the information processing apparatus 100 and the projector 200 are connected by Dual link DVI, when the Dual link DVI is operated, respective pixel data of adjacent two pixels is automatically allocated to respective two systems (a first system and a second system), taking two pixels as a pair. For example, pixel data of a certain pixel (assumed to be 0th pixel) can be transmitted from the first system and pixel data of a pixel (assumed to be first pixel) adjacent to the 0th pixel is can be transmitted from the second system at the same time. The processing is a standard function included in a common information processing apparatus.

The projection system according to third embodiment will described using n=8-bit and m=12-bit for purposes of clarity.

Figures 6A, 6C, 6D:
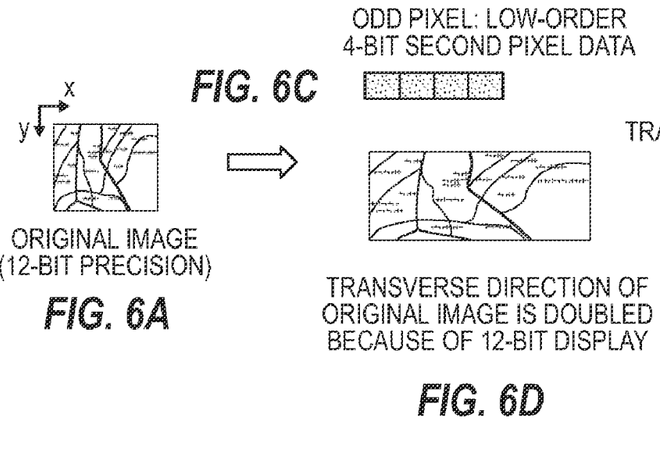
FIGS. 6A-6F illustrate image data processing executed in a projection system according to a third embodiment.

FIGS. 6A-6F illustrate a image data process executed in the projection system according to a third As shown in FIGS. 6A-6F, an original image, shown in FIG. 6A having 12-bit precision is divided into a set of first high-order 8-bit pixel data and a set of second low-order 4-bit pixel data, and the first pixel data and the second pixel data are allocated as adjacent pixels in the horizontal direction (x-axis direction), as components of the original image.

Figure 6B:
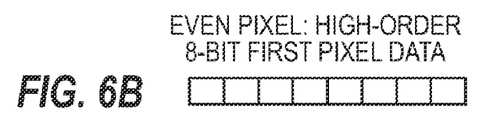

More specifically, high-order 8-bit first pixel data in each pixel is written at image data writing positions corresponding to 0, 2, 4, . . . th even pixels in the x-axis direction of the original image, as shown in FIG. 6B. At image data writing positions corresponding to 1, 3, 5, . . . th odd pixels in the x-axis direction of the original image low-order 4-bit second pixel data in the pixel is written, as shown in FIG. 6C.

Accordingly, high-order 8-bit first pixel data is written in even pixels and low-order 4-bit second pixel data is written in odd pixels, thereby allowing the length of the original image, shown in FIG. 6A, to be doubled in the horizontal direction (x-axis direction), as shown in FIG. 6D. Then, the first pixel data and the second pixel data are transmitted to the projector 200 as a pair of pixel data by using the function of Dual link DVI. The process shown in FIG. 6A-6D are performed by the image data dividing processing unit 112.

Dual link DVI has a function of allocating a pair of data into the first and second transmission systems as well as transmitting the two allocated information at the same time. Therefore, the first pixel data written in the even pixel and the second pixel data written in odd pixel are automatically allocated into the first system and the second system and transmitted to the projector 200 at the same time.

The projector 200 receives the first pixel data written in even pixel and the second pixel data written in odd pixel at the same time at the image data receiving unit 210 having a receiving function corresponding to Dual link DVI. Then the received first pixel data and the second pixel data are stored in the received image data holding unit 220. Then, the image decoding unit 230 synthesizes the first pixel data and the second pixel data stored in the received image data holding unit 220 on the frame buffer based on the predetermined synthesis rule, shown in FIG. 6E.

Figures 6E, 6F:
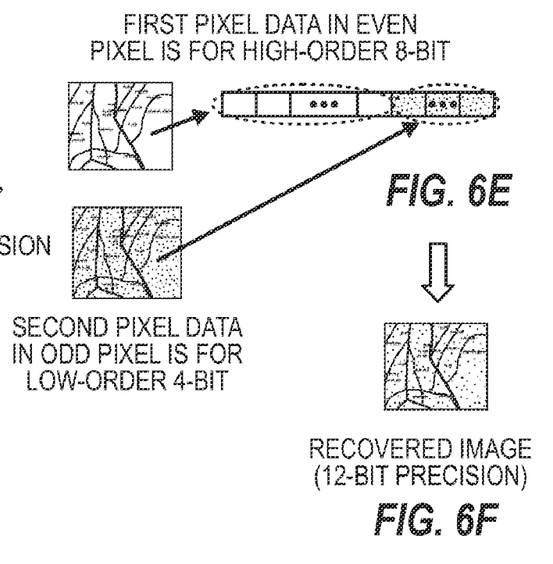

The synthesis rule in this case is a synthesis rule wherein pixel data written at positions of the even pixel (first pixel data) is designated as high-order bit and pixel data written at positions of the odd pixel (second pixel data) is designated as low-order bit in the pixel. Synthesis is performed based on this synthesis rule.

Since the projector 200 is able to receive a pair, comprising an even pixel and an odd pixel at the same time, the first pixel data and the second pixel data are written in the frame buffer as a pair of pixel information. The processing is performed for each pixel, thereby recovering the data as the original image having 12-bit precision at each pixel, as shown in FIG. 6E.

In the projection system according to the third embodiment, explanation was made on condition that the bit precision which can be outputted by the information processing apparatus 100 is 8-bit and the bit precision which can be expressed by the projector is 12-bit. However, in another preferred embodiment, that the bit precision of the projector can be 16-bit. In existing projectors, 16-bit precision is sufficient performance, and the invention can be applied to high-performance projectors adequately.

It is necessary that an information amount that is equal to or more than a certain level flows in the DVI cable for allowing Dual link DVI to function. The size of the information amount is determined according to resolution, the number of colors, bit precision, a frame rate and the like. When the information amount according to combination of the resolution, the number of colors, the bit precision, the frame rate and the like has the sufficient size for allowing Dual link DVI to function, the previously described process is possible.

When the information amount does not reach the size for allowing Dual link DVI to function, when an information processing apparatus having low image processing performance is used, or when Single link DVI is used as the transmission unit connecting the information processing apparatus to the projector, the projector 200 can automatically receive only the first pixel data and perform display processing as n-bit image data which can be outputted by the information processing apparatus. Accordingly, in the projection system according to the third embodiment, the low-gradation display mode and the high-gradation display mode can be switched according to image processing performance of the information processing apparatus, specifications of the transmission unit of image data, and the like, depending on the specific hardware configuration.

In the projection system according to the third embodiment, the Dual link DVI was used as an example. However, the present invention is not limited to Dual link DVI, and other transmission units having an equivalent functions may be used, such as those where pixel data of three or more adjacent pixels is taken as a set, and a set of pixel data is allocated to plural transmission lines (three or more transmission lines) which are transmitted at the same time. In this case, the information processing apparatus 100 is capable of transmitting respective pixel data of k-pieces (three or more) of pixel data to the projector 200 as a set of data by the transmission unit at the same time, and the projector 200 is capable of synthesizing respective pixel data of k-pieces of pixel data as a set of data transmitted from the information processing apparatus 100 based on the set synthesis rule.

The invention is not limited to the above embodiments, and various modifications can be performed without departing from the scope of the invention. For example, in the above embodiments, the high-order n-bit is used as the first set of data, however, it is not always necessary that n-bit in m-bit is high-order n-bit, but it is also possible that arbitrary n-bit is taken from m-bit pixel data, for example, on alternate bits.

In the above respective embodiments, the explanation was made on condition that m≦2n, however, in the first and second embodiment, the condition may be m>2n. In this case, the number of pixel data "k" obtained by dividing m-bit pixel data is three or more, the above processing can be executed based on the condition that "k" is three or more.

In embodiments of the invention, image data transmitted from the information processing apparatus 100 to the projector 200 may be an analog signal. In the case that the analog signal is transmitted to the projector 200, when it is converted to digital in the projector, a loss by the conversion may occur in low-order bit, and the loss in low-order bit may affect the high-order bit when the image is recovered by the projector 200. In order to solve this, it is efficient that the more reliable high-order bit in n-bit which can be outputted by the information processing apparatus 100 is used.

What is claimed is:

1. A projection system, comprising:
   an information processing apparatus capable of processing image data corresponding to an image to be displayed comprised of m-bit pixel data and outputting k-pieces of pixel data of at most n-bits; and
   a projector capable of receiving the k-pieces of pixel data from the information processing apparatus, performing a synthesis process of the k-pieces of pixel data of the image data processed by the information processing apparatus based on a predetermined synthesis rule in order to generate a synthesized image comprised of m-bit pixel data, and displaying the synthesized image,
   wherein k is an integer of 2 or more and n and m are integers which are greater than zero, and
   wherein the k-pieces of pixel data associated with one pixel of image data of the image to be displayed comprises a first set of high-order n-bit image data and a second set of pixel data with at most (m-n) bits.

2. The projection system according to claim 1, wherein the projector gives virtual resolution information to the information processing apparatus indicating that the projector is capable of displaying images with resolution k-times higher than the original resolution to the information processing apparatus, wherein the information processing apparatus sets an image data writing area corresponding to the resolution that is k-times higher the original resolution based on the virtual resolution information received from the projector and writes each pixel data of the k-pieces of pixel data in each pixel in the image data at corresponding writing positions in the k-times image data writing area in order to output image data having resolution k-times higher than the original resolution.

3. The projection system according to claim 1, wherein the projector gives virtual frame rate information to the information processing apparatus indicating that the projector performs processing at a frame rate which is k-times higher than the original frame rate, and the information processing apparatus sets an image data writing area corresponding to the frame rate which is k-times higher than the original frame rate based on the virtual frame rate information given from the projector and then writes the pixel data of the k-pieces of pixel data in each pixel of the image data at corresponding writing positions in consecutive frames in the time axis in order to generate and output image data having a frame rate k-times higher than the original frame rate.

4. The projection system according to claim 1, wherein the projection system further comprising a plurality of transmission lines capable of transmitting the information from the information processing apparatus to the projector at the same time and an image data transmission unit capable of transmitting pixel data of adjacent pixels over the plurality of transmission lines, wherein the information processing apparatus transmits each of the k-pieces of pixel data to the projector by the transmission unit in a single set of transmitted data, and the projector synthesizes each of the k-pieces of pixel data in the single set of pixel data transmitted from the image processing apparatus based on the predetermined synthesis rule.

5. The projection system according to claim 4, wherein the image data transmission unit is capable of transmitting data of two adjacent pixels as a pair of pixel data by allocating the pair of pixel data to two transmission lines, and the projector synthesizes the two-pieces of pixel data as the pair of pixel data transmitted from the information processing apparatus based on the predetermined synthesis rule.

6. An information processing apparatus for a projection system including a projector, the information processing apparatus comprising:
   an image data dividing unit capable of processing image data corresponding to an image comprised of m-bit pixel data into k-pieces of pixel data of at most n-bits; and
   an image data transmission unit capable of transmitting the k-pieces of pixel data of at most n-bits to a projector,
   wherein k is an integer of 2 or more and the projector is capable of receiving the k-pieces of pixel data, performing a synthesis process of the k-pieces of pixel data based on a predetermined synthesis rule in order to generate a synthesized image comprised of m-bit pixel data, and displaying the synthesized image,
   wherein n and m are integers which are greater than zero, and
   wherein the k-pieces of pixel data comprise a first set of high-order n-bit image data and a second set of pixel data with at most (m-n) bits.

7. The information processing apparatus according to claim 6, wherein image data transmission unit further comprises a plurality of transmission lines capable of transmitting the information from image data dividing unit to the projector at the same in a single set of transmitted data, and the projector synthesizes each of the k-pieces of pixel data in the single set of pixel data transmitted from the image processing apparatus based on the predetermined synthesis rule.

8. The information processing apparatus according to claim 7, wherein the image data transmission unit is capable of transmitting data of two adjacent pixels as a pair of pixel data by allocating the pair of pixel data to two transmission lines, and the projector is capable of synthesizing the two-pieces of pixel data as the pair of pixel data transmitted from the information processing apparatus based on the predetermined synthesis rule.

9. A projector which is used for a projection system comprising an information processing apparatus capable of processing image data corresponding to an image to be displayed, the projector comprising:

an image data receiving unit capable of receiving image data from the information processing apparatus, the image data comprising k-pieces of pixel data corresponding to an image comprised of m-bit pixel data which has been divided into k-pieces by the information processing apparatus;

an image decoding unit capable of performing a synthesis process of the k-pieces of pixel data based on a predetermined synthesis rule in order to generate a synthesized image comprised of m-bit pixel data; and an image display unit capable of displaying the synthesized image, wherein k is an integer of 2 or more and n and m are integers which are greater than zero, and wherein the k-pieces of pixel data comprise a first set of high-order n-bit image data and a second set of pixel data with at most (m-n) bits.

* * * * *